United States Patent
Gemassmer

(10) Patent No.: US 11,177,748 B2
(45) Date of Patent: Nov. 16, 2021

(54) FIELD-ORIENTED CONTROL OF A PERMANENTLY EXCITED SYNCHRONOUS RELUCTANCE MACHINE

(71) Applicant: GKN Automotive Ltd., Birmingham (GB)

(72) Inventor: Tobias Gemassmer, Bonn (DE)

(73) Assignee: GKN Automotive Ltd., Birmingham (GB)

(*) Notice: Subject to any disclaimer, the term of this patent is extended or adjusted under 35 U.S.C. 154(b) by 0 days.

(21) Appl. No.: 16/642,486

(22) PCT Filed: Aug. 29, 2017

(86) PCT No.: PCT/EP2017/071662
§ 371 (c)(1),
(2) Date: Feb. 27, 2020

(87) PCT Pub. No.: WO2019/042533
PCT Pub. Date: Mar. 7, 2019

(65) Prior Publication Data
US 2020/0266744 A1    Aug. 20, 2020

(51) Int. Cl.
*H02P 21/10* (2016.01)
*H02P 21/20* (2016.01)
(Continued)

(52) U.S. Cl.
CPC .............. *H02P 21/10* (2013.01); *B60L 15/20* (2013.01); *H02P 21/20* (2016.02); *H02P 21/22* (2016.02)

(58) Field of Classification Search
CPC .......... H02P 21/10; H02P 21/20; H02P 21/22; B60L 15/20
(Continued)

(56) References Cited

U.S. PATENT DOCUMENTS 6,407,531 B1* 6/2002 Walters .................. H02P 6/085
318/805
6,850,033 B1* 2/2005 Gallegos-Lopez .........................
H02P 21/0089
318/800
(Continued)

FOREIGN PATENT DOCUMENTS

EP    2544362 A2    1/2013
EP    3104520 A1    12/2016
(Continued)

OTHER PUBLICATIONS

Sepulchre Leopold et al: "Flux-weakening strategy for high speed PMSM for vehicle application", 2016 International Conference on Electrical Systems for Aircraft, Railway, Ship Propulsion and Road Vehicles & International Transportation Electrification Conference (ESARS-ITEC), IEEE, Nov. 2, 2016; XP033059462; DOI: 10.1109/ESARS-ITEC.2016.7841413; retrieved Feb. 2, 2017.
(Continued)

*Primary Examiner* — Jorge L Carrasquillo
(74) *Attorney, Agent, or Firm* — Bejin Bieneman PLC

(57) ABSTRACT

For the field-oriented control of a permanently excited synchronous machine with reluctance torque a flux-generating current component and a torque-generating current component are determined as a function of a required torque. A voltage component in the flux direction is determined as a function of the flux-generating current component, and a voltage component perpendicular to the flux direction is determined as a function of the torque-generating current component. Upon determining a differential amount by subtracting a vectorial sum of the voltage components from a maximum voltage a first differential value is obtain, via output from a PI-voltage controller, based on the differential amount. Upon determining an input voltage component based on the flux-generating current component and the first
(Continued)

differential value, the permanently excited synchronous machine is controlled based on the input voltage component.

14 Claims, 1 Drawing Sheet

(51) Int. Cl.
*H02P 21/22* (2016.01)
*B60L 15/20* (2006.01)

(58) Field of Classification Search
USPC .................................................. 318/400.02
See application file for complete search history.

(56) References Cited

U.S. PATENT DOCUMENTS

| | | | | |
|---|---|---|---|---|
| 2009/0261774 | A1* | 10/2009 | Yuuki | H02K 21/042 |
| | | | | 318/720 |
| 2013/0009574 | A1* | 1/2013 | Yoo | H02P 21/22 |
| | | | | 318/400.02 |
| 2013/0257324 | A1* | 10/2013 | Maekawa | H02P 21/14 |
| | | | | 318/400.02 |
| 2014/0306638 | A1 | 10/2014 | Wu et al. | |
| 2015/0028792 | A1* | 1/2015 | Tang | H02P 21/06 |
| | | | | 318/798 |
| 2015/0381081 | A1* | 12/2015 | Bhangu | H02P 21/0089 |
| | | | | 318/400.05 |

FOREIGN PATENT DOCUMENTS

| | | | |
|---|---|---|---|
| JP | 2014151700 A | | 8/2014 |
| JP | 2017055552 A | * | 3/2017 |
| JP | 2017055552 A | | 3/2017 |
| WO | 2015198569 A1 | | 12/2015 |

OTHER PUBLICATIONS

Lemmens Joris et al: "PMSM Drive Current and Voltage Limiting as a Constraint Optimal Control Problem", IEEE Journal of Emerging and Selected Topics in Power Electronics, IEEE, Piscataway, NJ, USA, vol. 3, No. 2, Jun. 1, 2015; XP011579996, ISSN: 2168-6777; DOI: 10.1109/JESTPE.2014.2321111; retrieved Apr. 30, 2015.
International Search Report and Written Opinion for PCT/EP2017/071662 dated May 4, 2018 (16 pages; with English translation).
JPO Office Action dated Apr. 27, 2021 for Application No. JP2020-512721 (12 pages; with English translation).

* cited by examiner

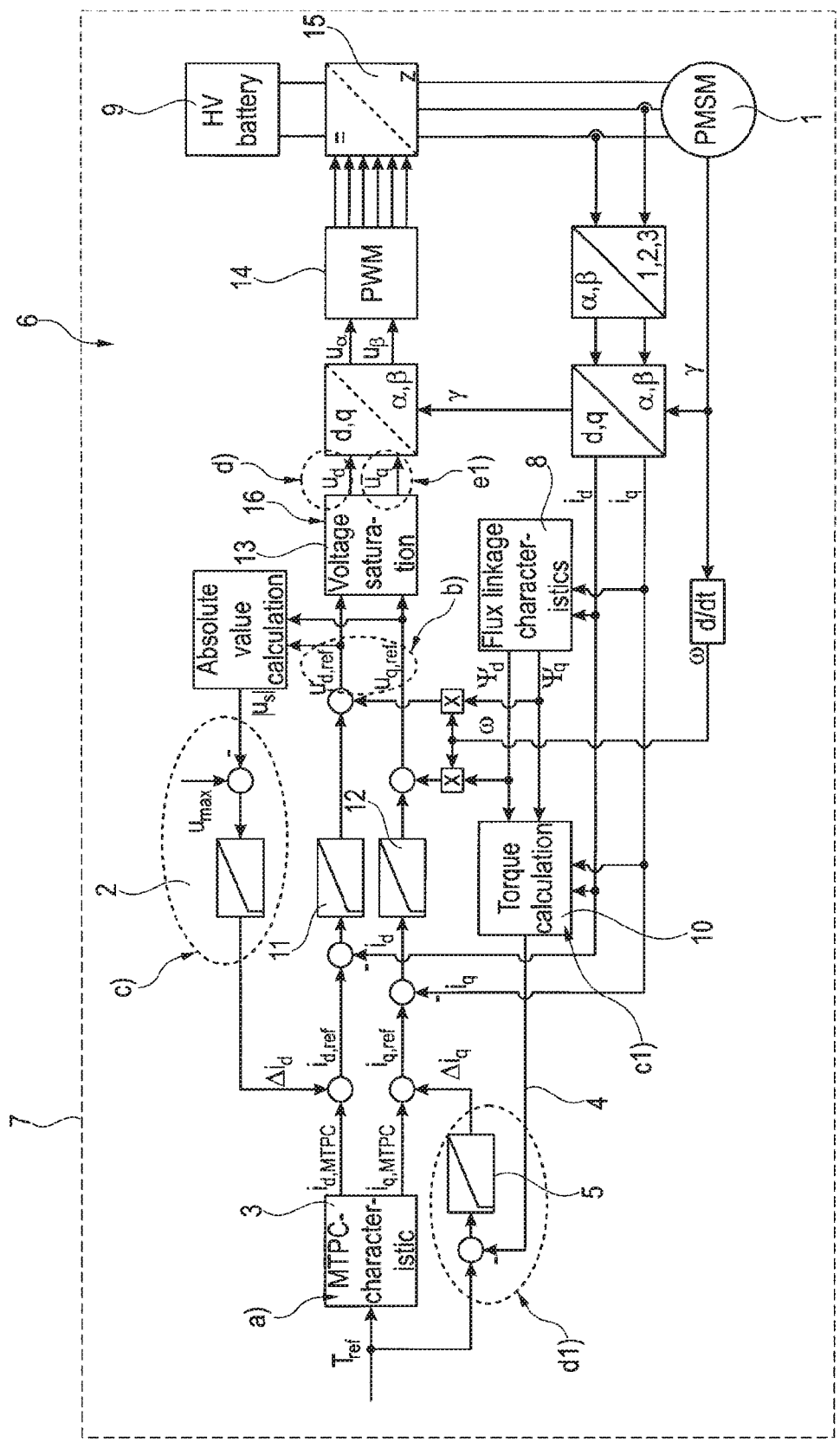

FIELD-ORIENTED CONTROL OF A PERMANENTLY EXCITED SYNCHRONOUS RELUCTANCE MACHINE

CROSS-REFERENCE TO RELATED APPLICATIONS

This application is a national stage of, and claims priority to, Patent Cooperation Treaty Application No. PCT/EP2017/071662, filed on Aug. 29, 2017, which application is hereby incorporated herein by reference in its entirety.

BACKGROUND

Permanent-magnet excited synchronous machines (PMSM) can be employed as electrical machines in electric vehicles. In comparison with asynchronous machines, these deliver a higher efficiency and a superior power density. Variants with magnets incorporated in the rotor are preferred as a design of a permanent-magnet excited synchronous machine ("Interior Permanent Magnet Synchronous Machines", or IPMSM). In comparison with a design using surface-mounted magnets, these provide various advantages with respect to application as a traction drive unit: in synchronous machines with interior magnets, as a result of higher magnetic conductivity in the transverse axis (q-axis) in comparison with the axis oriented longitudinally to the permanent magnets (d-axis), in addition to the synchronous torque, a reluctance torque can be exploited, which specifically takes effect in the field-weakening range. As a result of the additional reluctance torque, the machine can be configured with a comparatively smaller quantity of magnetic material, thereby reducing material costs. Moreover, the flux generated by the permanent magnets is smaller, as a result of which, in addition to drag losses, both the no-load voltage and the short-circuit torque are reduced, thereby signifying an improvement in intrinsic safety.

Reluctance torques occur in the event of a difference between inductance in the field direction and the inductance oriented perpendicularly thereto. In a synchronous machine, in which the q-inductance and the d-inductance are mutually different, the rotor is not rotationally symmetrical. In a synchronous machine with interior magnets, the q-inductance and the d-inductance are different. Moreover, as a result of the interior magnets, the rotor is not rotationally symmetrical.

In permanent-magnet excited synchronous machines with pronounced reluctance, from the potential combinations of target current values $i_d$ and $i_q$ for any desired torque, that combination should be selected which ensures optimum operation. As a potential criterion for this purpose, the minimization of the sum of all losses occurring can be employed. A simplification is constituted by the criterion for torque generation at the minimum stator current, at which (only) ohmic losses are minimized. In general, this represents a good approximation, as differences in efficiency, in comparison with the minimization of overall losses, may be small. Where a torque is required at higher speeds of rotation, target values for the current components can no longer be freely selected according to the above-mentioned criteria for loss reduction, on the grounds of the necessity, in this case, for the consideration of operating limits with respect to the current converter output voltage and the stator current amplitude.

Appropriate predefined target current values for the required torques are/can be entered in characteristic diagrams which are saved in a control device of a motor vehicle. Multi-dimensional characteristic diagrams can thus be consulted, in which target current values are entered, e.g. as a function of the required torques and as a function of voltage to speed ratios (two dimensions). In the event that it is also necessary to consider the changing temperature of the rotor of the synchronous machine, this gives rise to a further dimension, in this case a third dimension. However, an evaluation of these characteristic diagrams can require, firstly, a substantial computing capacity and, secondly, a certain amount of time for the establishment of the required target current values.

SUMMARY

The present disclosure relates to a method for the field orientated control of a permanently excited synchronous machine, e.g., employed for propelling a motor vehicle, which has a reluctance torque.

The present disclosure provides a method whereby the required torque (insofar as achievable and/or independent of speed) can be achieved with the lowest possible machine current. Specifically, for the determination of target current values, it should not be necessary to retrieve data which are entered in multi-dimensional characteristic diagrams.

A method for the field-oriented control of a permanently excited synchronous machine with reluctance torque comprises:

a) determining a flux-generating current component $i_{d,MTPC}$ and a torque-generating current component $i_{q,MTPC}$, as a function of a required torque $T_{ref}$;

b) determining a voltage component in the flux direction $u_{dref}$ and of a voltage component perpendicular to the flux direction $u_{qref}$, as a function of the current components $i_{d,MTPC}$ and $i_{q,MTPC}$;

c) determining a differential amount from a vectorial sum $u_s$ of the voltage components $u_{dref}$ and $u_{qref}$ and a maximum voltage $u_{max}$, and processing the differential amount in a PI-voltage controller, wherein a first differential value $\Delta i_d$ is obtained as an output variable;

d) Adding the flux-generating current component $i_{d,MTPC}$ and the first differential value $\Delta i_d$, and determining a voltage component $u_d$ for input into the synchronous machine.

The current components $i_{d,MTPC}$ and $i_{q,MTPC}$ in step a) can be read out respectively from a first characteristic diagram, wherein the first characteristic diagram is one-dimensional, and specifically wherein $i=f(T_{ref})$. Specifically, this signifies that the current components $i_{d,MTPC}$ and $i_{q,MTPC}$ entered in the first characteristic diagram are exclusively present as a function of the required torque. Accordingly, in this case, a first characteristic diagram with a limited number of values is provided, which can be read out in a short time and/or with a limited computing capacity. The first characteristic diagram can also in each case be calculated e.g. using a polynomial wherein, here again, only a limited number of values are provided.

The current components $i_{d,MTPC}$ and $i_{q,MTPC}$ are determined as a function of the torque required (e.g. by a driver of the motor vehicle or by a control device of the motor vehicle). The voltage components $u_{dref}$ and $u_{qref}$ are determined on this basis.

In step c), the vectorial sum $u_s$ (i.e. the result of a vectorial addition) of the voltage components is compared with a maximum voltage of the synchronous machine (i.e. a maximum permissible or a maximum applicable voltage), or a differential amount is determined. The vectorial sum $u_s$ is compared here by way of a quantity (i.e. independent of direction) with the maximum voltage. The output variable of the PI-controller (proportional-integral-controller) is a first differential value $\Delta i_d$ (positive or negative) which, in step d), is added to the current component $i_{d,MTPC}$.

The maximum voltage $u_{max}$ can also incorporate a control reserve, which specifically does not exceed a maximum of 10% of the quantity of the maximum voltage $u_{max}$ applied here.

The new value for the current component $i_{dref}$ obtained according to step d) is now employed for the determination of the voltage component $u_d$ to be input. In the determination of the voltage component $u_d$ to be input, the saturation behavior of the synchronous machine can be considered.

The current component $i_d$ to be input proceeds from the voltage component $u_d$ to be input due to the input of the voltage component to the synchronous machine.

Specifically, the voltage component $u_d$, via the control circuit of an inverter, is applied to the synchronous machine by means of a pulse-width modulator (PWM). As a result, specifically, three-phase currents are generated, of which preferably (at least) two are measured. The d/q-components can be back-calculated from the measured currents, by the application of the likewise calculated angle of rotation of the synchronous machine.

The current component $i_d$ determined by measurement can be fed back by means of the controller, and subtracted from the current component $i_{dref}$. The differential thus obtained can be processed by a first PI-current controller wherein, by way of an output variable, and in consideration of an angular frequency w of the rotor of the synchronous machine, or in consideration of a flux linkage $psi_q$, the voltage component $u_{d,ref}$ is determined. In consideration of the maximum current converter output voltage, the voltage component $u_d$ to be input is determined from the voltage component $u_{d,ref}$.

Following step b), in a further step c1), an achieved torque (i.e. generated in the synchronous machine) can be determined (i.e. evaluated or calculated) by reference to the (measured) current components $i_d$ and $i_q$, and the associated flux linkages.

In a further step d1), a differential quantity can be determined from the achieved torque and the required torque, and processed in a PI-torque controller. By way of an output variable of the PI-torque controller, a second differential value $\Delta i_q$ is obtained.

In a step e1), the current component $i_{q,MTPC}$ and the differential value $\Delta i_q$ can be added, and a voltage component $u_q$ which is to be input into the synchronous machine can be determined.

The new value obtained for the current component $i_{qref}$ according to step e1) can be employed for the determination of the voltage component $u_q$ to be input.

The steps c1), d1) and e1) are preferably executed in a common process.

The achieved torque (or the calculated or evaluated present torque) is the torque delivered by the synchronous machine with the voltage components and current components presently in force.

Steps c1), d1) and e1) are specifically executed in a temporally parallel manner to steps c) and d). Steps c) and d), and steps c1), d1) and e1), are specifically executed a number of times in sequence wherein, specifically, increasingly accurate values for the voltage components $u_d$ and $u_q$ and the current components $i_d$ and $i_q$ to be input into the synchronous machine are determined. This applies to a stationary working point. In the event of a change to the working point, e.g. a variation in the required torque and/or a change of speed, this control will need to be retuned. The calculation can be initiated in a cyclical manner in the context of machine control, e.g. every 100 μs (corresponding to 10 kHz).

The (present) achieved torque can be determined (calculated or evaluated) by the application of the following formula:

$$T = 3/2 * p * (psi_d(i_d, i_q) * i_q - psi_q(i_d, i_q) * i_d);$$

where
T: is the achieved torque;
p: is the pole pair number of the synchronous machine;
psi: is the flux linkage.

The values $psi_d(i_d, i_q)$ and $psi_q(i_d, i_q)$ for the flux linkages (sometimes also described as the coil flux, which is the product of the physical magnetic flux actually present in a coil and the number of turns N in the coil), on the grounds of the saturation behavior of the synchronous machine, are dependent upon the current components $i_d$ and $i_q$. Values for the flux linkages can specifically be entered in a second characteristic diagram, or determined by calculations. Flux linkages are required, independently of the proposed method for the operation and/or control of the synchronous machine, specifically for the determination of induced counter-voltages.

Specifically, by way of input variables, the method exclusively employs the required torque and the maximum voltage or a maximum current converter output voltage. The maximum voltage can be limited by the present DC voltage (battery voltage) and, by modulation in the converter, the maximum voltage can then be determined, which can be applied to the machine.

In the event of an unchanged (i.e. constant) required torque $T_{ref}$ (over a given period), the steps c) and d), together with c1), d1) and e1), can be executed repeatedly for the iterative determination of the voltage components $u_d$ and $u_q$ and the current components $i_{dref}$ and $i_{qref}$ to be input.

As a result of the limited computing capacity required, the present method can now proceed at a high speed such that, within a shorter time, an accurate control of the voltage components $u_d$ and $u_q$ and the current components $i_d$ and $i_q$ to be input can be executed. Consequently, the time period required for iterative determination, during which an unchanged torque is to be present, is only of the order of a few milliseconds, specifically less than 0.1 seconds, and preferably less than 0.01 seconds.

Specifically, the time period indicated relates (only) to the process for the retuning of control, i.e. the time interval or the number of passes required for achievement of a stable and essentially optimum working point at the voltage limit.

The high speed of the method specifically proceeds from the short computing time requirement within the algorithm. If the entire algorithm is initiated e.g. every 100 μs, the computing time can be limited here, for example, to a maximum of 60 μs. By the economization of complex computing processes and/or storage requests, moreover, a simpler and more cost-effective controller can be employed.

The new value for the current component $i_{qref}$ obtained according to step e1) is now employed for the determination of the voltage component $u_q$ to be input. In the determination of the voltage component $u_q$ to be input, the saturation behavior of the synchronous machine can be considered.

In the synchronous machine, the current component $i_q$ proceeds from the voltage component $u_q$ to be input. This current component can be measured or converted.

The attuned current component $i_q$ can be fed back via the controller and subtracted from the current component $i_{qref}$.

The differential thus obtained can be processed by a second PI-current controller wherein, by way of an output variable, and in consideration of an angular frequency ω of the rotor of the synchronous machine, or in consideration of a flux linkage $psi_d$, the voltage component $u_{q,ref}$ is determined. In consideration of the maximum current converter output voltage, the voltage component $u_q$ to be input is determined from the voltage component $u_{q,ref}$.

A controller for the field-oriented control of a permanently excited synchronous machine with reluctance torque is further proposed, wherein the control of the synchronous machine is executed in accordance with the above-mentioned method, or wherein the controller is configured for the execution of the method described.

By way of input variables, the controller at least (or even exclusively) employs a required torque $T_{ref}$ and a maximum voltage $u_{max}$, wherein the controller comprises a PI-voltage controller, in which a differential amount can be determined from a vectorial sum $u_s$ of the voltage components $u_{dref}$ and $u_{qref}$, together with the maximum voltage, in order to obtain an output variable $\Delta i_d$.

The controller can comprise a PI-torque controller, in which a differential amount can be processed from the (present) achieved torque, together with the required torque, in order to obtain an output variable $\Delta i_q$.

A motor vehicle is proposed, having a permanently excited synchronous machine with reluctance torque by way of a drive unit, wherein the synchronous machine is operable by means of an above-mentioned controller, or by the method described.

Statements with respect to the method apply correspondingly to the controller and the motor vehicle, and vice versa.

By way of a precaution, it should be observed that the numerals employed here ("first", "second", "third", etc.) are primarily (only) intended for the distinction of a plurality of equivalent objects, variables or processes and thus, specifically, do not necessarily imply any mutual dependency and/or sequence of said objects, variables or processes. Should any such dependency and/or sequence be required, this shall be explicitly indicated herein, or shall be evident to a person skilled in the art from an examination of the specific embodiment described.

SUMMARY OF THE DRAWINGS

The disclosure and its technical scope are described in greater detail hereinafter with reference to the FIGURE. It should be observed that the exemplary embodiment represented is not intended to limit the disclosure. Specifically, unless explicitly represented otherwise, it is also possible for partial aspects of the subject matter represented in the FIGURE to be extracted and combined with other elements and findings from the present description.

FIG. 1 shows a schematic representation of a motor vehicle having a synchronous machine and a controller, which is specifically configured for the execution of the method described herein.

DESCRIPTION

A motor vehicle 7 is illustrated, having a synchronous machine 1 and a controller 6. The synchronous machine 1 and the controller 6 are connected to a voltage supply 9 and an inverter 15.

The function of the controller 6 is the field-oriented control of the permanently excited synchronous machine 1 with reluctance torque. The controller 6 requires, by way of input variables, a required torque $T_{ref}$ and a maximum voltage $u_{max}$, wherein the controller 6 comprises a PI-voltage controller 2, in which a differential amount from a vectorial sum $u_s$ of the voltage components and the maximum voltage $u_{max}$ can be processed in order to obtain an output variable $\Delta i_d$.

The controller 6 further comprises a PI-torque controller 5, in which a differential amount from the achieved torque 4 and the required torque $T_{ref}$ can be processed in order to obtain an output variable $\Delta i_q$.

The method for the field-oriented control of a permanently excited synchronous machine 1 with reluctance torque comprises, according to step a) determining a flux-generating and a torque-generating current component ($i_{d,MTPC}$, $i_{qMTPC}$) as a function of a required torque $T_{ref}$. According to step b), the method comprises determining a voltage component ($u_{dref}$, $u_{qref}$) in, and perpendicularly to the flux direction, as a function of the current components ($i_{d,MTPC}$, $i_{qMTPC}$). In step c), a differential amount is determined from a vectorial sum $u_s$ of the voltage components and a maximum voltage $u_{max}$, and is processed in a PI-voltage controller, wherein a first differential value $\Delta i_d$ is obtained as an output variable. According to step d), the current component $i_{d,MTPC}$ and the first differential value $\Delta i_d$ are added, and a voltage component $u_d$ to be input into the synchronous machine 1 is determined. By the addition of the current component $i_{d,MTPC}$ and the first differential value $\Delta i_d$, a current component $i_{dref}$ is calculated.

The current components $i_{d,MTPC}$ and $i_{q,MTPC}$ in step a) are read out respectively from a first characteristic diagram 3, wherein the first characteristic diagram 3 (or the first respective characteristic diagram 3) is one-dimensional (i=f($T_{ref}$)). This signifies that the current components $i_{d,MTPC}$ and $i_{q,MTPC}$ entered in the first characteristic diagram 3 are exclusively present as a function of the required torque $T_{ref}$. Accordingly, in this case, a first characteristic diagram 3 with a limited number of values is provided, which can be read out in a short time and with a reduced computing capacity.

The current components $i_{q,MTPC}$ and $i_{qMTPC}$ are determined as a function of the torque $T_{ref}$ required (e.g. by a driver of the motor vehicle 7 or by a control device of the motor vehicle 7). The voltage components $u_{dref}$ and $u_{qref}$ are determined on this basis.

The new value for the current component $i_{dref}$ obtained according to step d) is employed for the determination of the voltage component $u_d$ to be input. In the determination of the voltage component $u_d$ to be input, the maximum current converter output voltage 16 can be considered (e.g. by the second controller section 13).

The current component $i_d$ on the synchronous machine proceeds from the voltage component $u_d$ to be input.

The current component $i_d$ can be fed back by means of the controller 6 and subtracted from the current component $i_{dref}$. The differential thus obtained can be processed by a first PI-current controller 11 wherein, by way of an output variable, and in consideration of an angular frequency ω of the rotor of the synchronous machine 1, or in consideration of a flux linkage $psi_q$, the voltage component $u_{d,ref}$ is determined. In consideration of the saturation behavior of the synchronous machine 1, the voltage component $u_d$ to be input is determined from the voltage component $u_{dref}$.

Following step b), in a further step c1), a present torque setting 4 is determined by reference to the voltage components ($u_d$, $u_q$) to be input and the attuned current components $i_d$, $i_q$). In a further step d1), a differential amount is constituted from the achieved torque 4 and the required torque $T_{ref}$, and processed in a PI-torque controller 5. By way of an output variable of the PI-torque controller 5, a second differential value $\Delta i_q$ is obtained. In a step e1), the current component $i_{q,MTPC}$ and the differential value $\Delta i_q$ are added, and a voltage component $u_q$ which is to be input into the synchronous machine is determined.

The new value obtained for the current component $i_q$ according to step e1) is employed for the determination of the voltage component $u_q$ to be input. In the determination of the voltage component $u_q$ to be input, the maximum current converter output voltage 16 can be considered (e.g. by the second controller section 13).

The current component $i_q$ on the synchronous machine 1 proceeds from the voltage component $u_q$ to be input.

The attuned current component $i_q$ can be fed back via the controller 6 and subtracted from the current component $i_{qref}$. The differential thus obtained can be processed by a second PI-current controller 12 wherein, by way of an output variable, and in consideration of an angular frequency $\omega$ of the rotor of the synchronous machine 1, or in consideration of a flux linkage $psi_d$, the voltage component $u_{q,ref}$ is determined. In consideration of the maximum current converter output voltage 16, the voltage component $u_q$ to be input is determined from the voltage component $u_{q,ref}$.

Steps c1), d1) and e1) can be executed in parallel with steps c) and d). Steps c) and d), and steps c1), d1) and e1) are executed a number of times in sequence, such that increasingly accurate values for the voltage components ($u_d$, $u_q$) and the attuned current components ($i_d$, $i_q$) to be input into the synchronous machine can be determined.

The achieved torque 4 is determined in consideration of the input variables $psi_d(i_d, i_q)$ and $psi_q(i_d, i_q)$ for flux linkages and the current components ($i_d$, $i_q$) in force on the synchronous machine 1, in the first controller section 10.

As a result of the saturation behavior of the synchronous machine 1, values are dependent upon the current components ($i_d$, $i_q$). Values for the flux linkages $psi_d(i_d, i_q)$ and $psi_q(i_d, i_q)$ can be entered in a second characteristic diagram 8.

Further elements of the controller 6 are employed for the known conversion of components which rotate with the rotor (symbols d or q; rotating coordinate system) into stationary components (symbols $\alpha$ and $\beta$; stationary coordinate system) and vice versa. Moreover, input of the voltage components $u_d$ and $u_q$ determined further to the above-mentioned conversion is executed by means of a third controller section 14 (pulse-width modulator), by pulse-width modulation (PWM).

LIST OF REFERENCE SYMBOLS

1 Synchronous machine
2 PI-voltage controller
3 First characteristic diagram
4 Achieved torque
5 PI-torque controller
6 Controller
7 Motor vehicle
8 Second characteristic diagram
9 Voltage supply
10 First controller section
11 First PI-current controller
12 Second PI-current controller
13 Second controller section
14 Third controller section
15 Inverter
16 Maximum current converter output voltage
$i_{d,MTPC}$ Current component
$i_{q,MTPC}$ Current component
$T_{ref}$ Required torque
$u_{dref}$ Voltage component
$u_{qref}$ Voltage component
$i_{dref}$ Current component
$i_{qref}$ Current component
$u_s$ Vectorial sum
$u_{max}$ Maximum voltage
$\Delta i_d$ First differential value
$u_d$ Voltage component
$u_q$ Voltage component
$i_d$ Current component
$i_q$ Current component
$\Delta i_q$ Second differential value
$\omega$ Angular frequency

The invention claimed is:

1. A method for the field-oriented control of a permanently excited synchronous machine with reluctance torque comprising:
   a) determining a flux-generating current component and a torque-generating current component as a function of a required torque;
   b) determining (a) a voltage component in a flux direction as a function of the flux-generating current component and (b) a voltage component perpendicular to the flux direction as a function of the torque-generating current component;
   c) upon determining a differential amount by subtracting a vectorial sum of the voltage components from a maximum voltage, obtaining a first current differential value, via output from a PI-voltage controller, based on the differential amount;
   d) upon determining an input voltage component based on a sum of the flux-generating current component and the first current differential value, determining an input current component based on the input voltage component;
   e) determining an achieved torque based on the input current component;
   f) upon determining a second differential amount by subtracting the achieved torque from the required torque, obtaining a second current differential value, via a PI-torque controller, based on the second differential amount;
   g) determining a second input voltage component based on a sum of the torque-generating current component and the second current differential value; and
   h) controlling the permanently excited synchronous machine based on the input voltage component and the second input voltage component.

2. The method of claim 1, further comprising obtaining the flux-generating current component and the torque-generating current component via a first characteristic diagram, wherein the first characteristic diagram is one-dimensional.

3. The method of claim 1, further comprising upon determining a differential by subtracting the input current component from the sum of the flux-generating current component and the first differential value, determining an updated input voltage component based on the differential.

4. The method of claim 3, further comprising determining the updated input voltage component based further on an angular frequency of a rotor or a flux linkage.

5. The method of claim 1, further comprising, upon determining a constant required torque, iteratively determining the input voltage component and the second input voltage component.

6. The method of claim 1, further comprising determining the achieved torque based further on flux linkages.

7. The method of claim 1, wherein the permanently excited synchronous machine is a drive unit of a motor vehicle.

8. A controller for the field-oriented control of a permanently excited synchronous machine with reluctance torque, programmed to:
   a) determine a flux-generating current component and a torque-generating current component as a function of a required torque;
   b) determine (a) a voltage component in a flux direction as a function of the flux-generating current component and (b) a voltage component perpendicular to the flux direction as a function of the torque-generating current component;
   c) upon determining a differential amount by subtracting a vectorial sum of the voltage components from a maximum voltage, obtain a first current differential value, via output from a PI-voltage controller, based on the differential amount; and
   d) upon determining an input voltage component based on a sum of the flux-generating current component and the first current differential value, determine an input current component based on the input voltage component;
   e) determine an achieved torque based on the input current component;
   f) upon determining a second differential amount by subtracting the achieved torque from the required torque, obtain a second current differential value, via a PI-torque controller, based on the second differential amount;
   g) determine a second input voltage component based on a sum of the torque-generating current component and the second current differential value; and
   h) control the permanently excited synchronous machine based on the input voltage component and the second input voltage component.

9. The controller of claim 8, wherein the controller is further programmed to obtain the flux-generating current component and the torque-generating current component via a first characteristic diagram, wherein the first characteristic diagram is one-dimensional.

10. The controller of claim 8, wherein the controller is further programmed to, upon determining a differential by subtracting the input current component from the sum of the flux-generating current component and the first differential value, determine an updated input voltage component based on the differential.

11. The controller of claim 10, wherein the controller is further programmed to determine the updated input voltage component based further on an angular frequency of a rotor or a flux linkage.

12. The controller of claim 8, wherein the controller is further programmed to, upon determining a constant required torque, iteratively determine the input voltage component and the second input voltage component.

13. The controller of claim 8, wherein the controller is further programmed to determine the achieved torque based further on flux linkages.

14. The controller of claim 8, wherein the permanently excited synchronous machine is a drive unit of a motor vehicle.

* * * * *